July 17, 1962  E. A. HOFFMANN  3,044,453
METHOD AND APPARATUS FOR FUEL COMBUSTION
Filed Nov. 29, 1961  2 Sheets-Sheet 1

INVENTOR.
EDWARD A. HOFFMANN
BY Roy E. Raney
ATTORNEY

INVENTOR.
EDWARD A. HOFFMANN

United States Patent Office 3,044,453
Patented July 17, 1962

3,044,453
METHOD AND APPARATUS FOR FUEL COMBUSTION
Edward A. Hoffmann, 3318 Carlisle Ave., St. Petersburg, Fla.
Filed Nov. 29, 1961, Ser. No. 155,679
5 Claims. (Cl. 123—25)

The present invention relates to a new method and apparatus for insuring complete combustion of hydrocarbon fuels utilizing atmospheric air so as to obtain maximum power from the fuel with little or no noxious products of combustion.

It is common practice to burn hydrocarbon fuels by mixing the fuel with atmospheric air in proportions depending on the discharge of a fixed orifice fuel feed into a stream of the air passing to the combustion area. Changes in air temperature and relative humidity thereof materially affect the degree of combustion of the fuel and because these changes occur continually, incomplete combustion will be the rule rather than the exception. It is therefore an object of my invention to provide a method and apparatus by which the optimum proportion of fuel and air for complete combustion is supplied to a combustion area with the temperature and relative humidity of the air and the pressure thereof being maintained at constant values so as to provide complete combustion of the fuel with the result that maximum power is obtained at all times with a minimum or absolute elimination of noxious products of combustion, irrespective of the temperature and relative humidity changes occurring in the atmosphere.

In carrying out the invention, I maintain the temperature of the air to be utilized in combustion at a given value and at 100% relative humidity, preferably by passing it through water heated to a degree which will warm the air to a given temperature and in a manner to raise its relative humidity to 100%, the air then being mixed with fuel fed into the air stream through a fixed orifice selected to provide a completely combustible mixture. In the preferred form of the invention, the water is maintained at a given temperature appreciably above atmospheric temperature by controlled heat exchange with products of combustion and the air is passed through the heated water at a relatively slow rate and in fine streams so that it is heated and brought to 100% relative humidity just before mixing with the fuel.

Other objects and advantages of the invention will be apparent from the following description of a preferred form of the invention, reference being made to the accompanying drawings wherein, FIG. 1 is a side view of a gasoline internal combustion engine showing an air heating and humidifying device in section;

Figure 1:
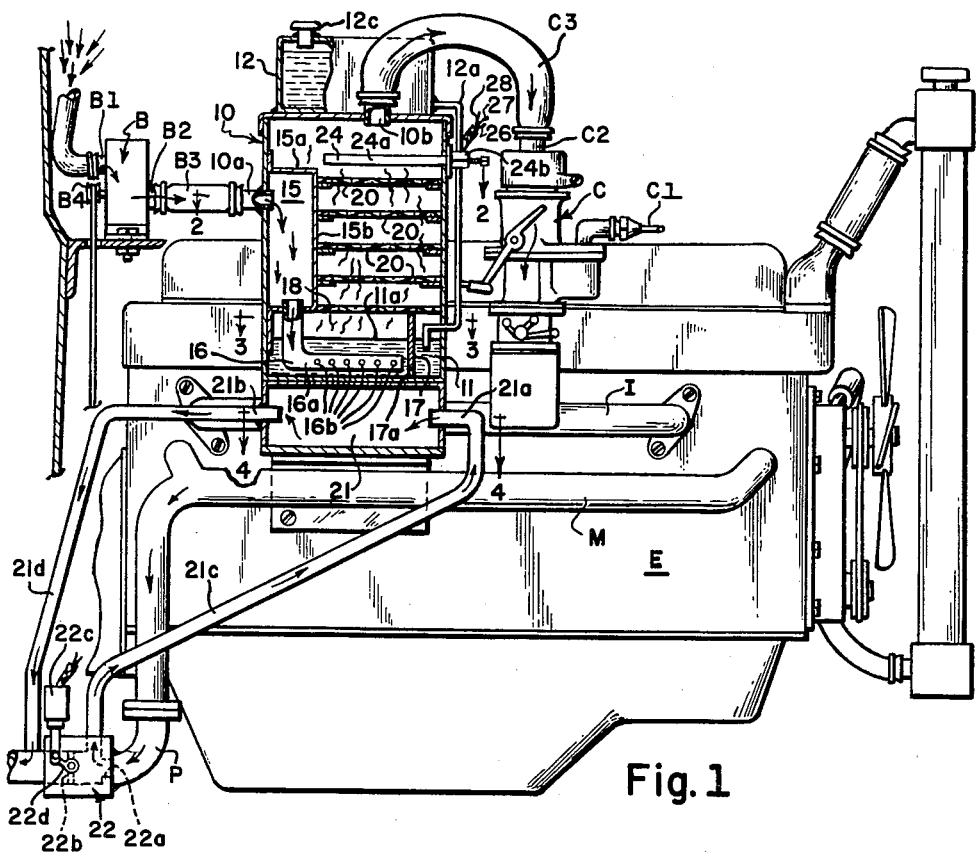
Figure 2:
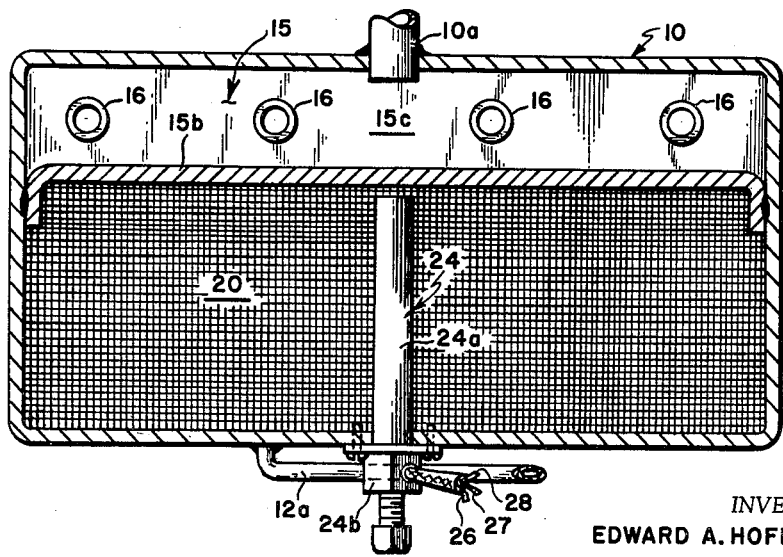
FIG. 2 is a sectional view taken along line 2—2 of FIG. 1.
Figure 3:
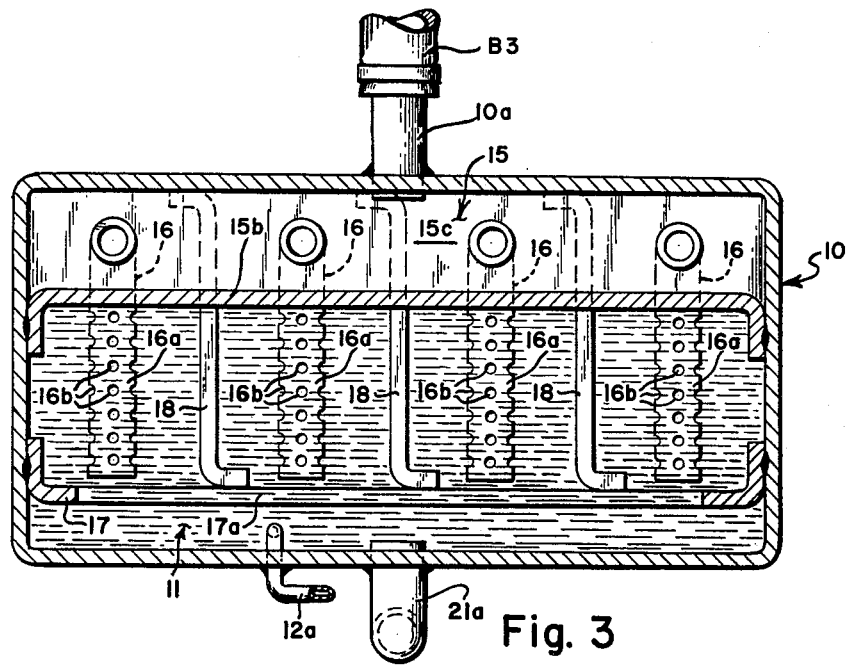
FIG. 3 is a sectional view taken along line 3—3 of FIG. 1.
Figure 4:
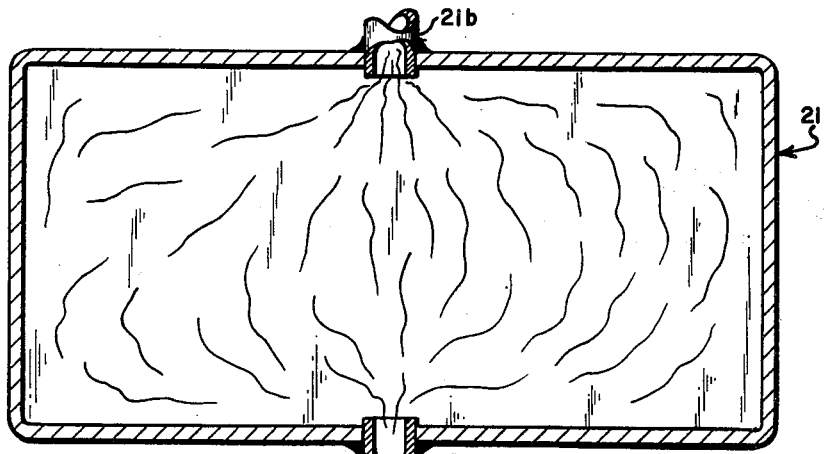
FIG. 4 is a sectional view taken along line 4—4 of FIG. 1.

It is to be understood that my invention can be employed in any apparatus which burns hydrocarbon fuel, such as oil burners, diesel engines or gasoline engines, to mention several examples. In the form of the invention here disclosed, I have shown a generally conventional internal combustion gasoline engine E which includes a fuel intake manifold I, and an exhaust manifold M to which an exhaust pipe P is connected. A combustible fuel mixture is fed to manifold I through a carburetor C which may be of conventional construction and which includes a fuel inlet line C1 and an air intake C2.

Air is fed to carburetor C through a tube C3 leading from an air processing tank, indicated generally at 10 and suitably supported adjacent to the engine E as shown, and which has air inlet 10a and an air discharge 10b, and means inside the tank to bring the air to a given temperature and to raise its relative humidity 100%, as is described presently. The tank is constructed to retain a body of water 11 therein at the level indicated at 11a, which level is maintained by the automatic addition of water to the tank from a reservoir 12, supported on the top of the tank, through a filler pipe 12a, which discharges water into the lower portion of the tank. The lower end of pipe 12a terminates at the water level 11a, and reservoir 12 is closed and sealed by a refill cap 12c, so that the reservoir is air tight and consequently water flows into tank 10 only when the lower end of tube 12a is uncovered to admit air to the reservoir. Any other sutable means could be employed to maintain the water level 11a.

Air is introduced into inlet 10a of tank 10 by a blower B, described more fully hereinafter, and is directed downwardly in an inlet chamber 15 formed by a U-shape sheet metal member having its edges secured to the left hand wall and the front and rear walls of the tank, as viewed in FIG. 1, so as to form a top chamber wall 15a, side wall 15b and bottom wall 15c. Four L-shape tubular air distributors 16 are attached to bottom wall 15c and are more or less equally spaced along the longer dimension of that wall, and each opens into the bottom of chamber 15 so as to receive air therein from chamber 15 and distribute the air into the body of water 11. Each distributor 16 comprises a horizontal portion 16a disposed well below level 11a of the water 11. The outer ends of portions 16a are closed, and a multiplicity of relatively small openings 16b are provided in these portions through which air forced into chamber 15 and distributors 16 is discharged in fine streams into the body of water. The total area of openings 16b is greater than the cross sectional area of tank inlet 10a or outlet 10b so that the rate of air flow through these openings is proportionately reduced so as to permit heating of the air by the water and for the air to attain 100% relative humidity. More or fewer distributors 16 could be employed depending upon the rate of air flow to the requirements of the particular engine involved.

To prevent excessive sloshing or surging of the water 11 in the tank, a partition 17 is provided attached at opposite ends to the front and rear walls of tank 10 and extending somewhat above water lever 11a. The partition 17 is cut away across the bottom as at 17a to permit flow of water across the tank bottom. Three separate panels 18 are also provided extending parallel to distributors 16 and the ends of which join the left hand wall of tank 10 and partition 17 to form compartments for each air distributor 16. The top edges of panels 18 are on the same plane as the top edge of partition 17.

As mentioned previously air passes from outlet 10b to carburetor C through a tube C3 and to prevent water drops from being carried by the air into the carburetor, a series of fine mesh screens 20 are disposed horizontally between wall 15b and the right hand side wall of tank 10, as viewed in FIG. 1, so that the air issuing from the body of water 11 passes through screens 20, which prevent drops of water from being carried through outlet 10b.

The temperature of the body of water 11 is maintained at a given degree, preferably somewhat above the maximum likely to be encountered in the prevailing atmosphere, by controlling the passage of hot exhaust gases through a heat exchanger 21, located under tank 10, in accordance with the temperature of the air passing to the outlet 10b of the tank. Heat exchanger 21 comprises a closed rectangular metal chamber having an inlet 21a in one side wall of the chamber and an outlet 21b in the opposite side wall of the chamber. The top wall of the heat exchanger is in close heat exchange relation with the bottom wall of tank 10, which is of a material having a high conductivity, and the two walls may be brazed or soldered together. The inlet 21a of the heat exchanger is connected by a tube 21c with an exhaust gas control valve 22, described more fully hereinafter, and the outlet of the exchanger is connected by a tube 21d to exhaust pipe P. It will be seen that exhaust gases directed through exchanger 21 will heat the water 11 in tank 10. Valve 22 is arranged to selectively direct exhaust gases through exchanger 21 or to permit the gases to pass directly through pipe P to exhaust. In the form of the invention shown, valve 22 comprises a tubular body which forms a section of pipe P and which has a diverting port 22a to which tube 21a is connected. A flapper valve member 22b is pivotally positioned in the main passage of the valve body and is shiftable about its pivot to a position to block the main exhaust passage through the body to divert gas out port 22a to exchanger 21, or it may be positioned to permit flow of the gases directly through the valve body, in which case the exchanger will not impart heat to tank 10. Valve member 22b is shifted about its pivot by the energization and deenergization of a solenoid 22c which is controlled by a thermostatic switch 24 which includes a thermally responsive element 24a disposed in the top portion of tank 10 and which actuates a suitable switch mechanism 24b located externally of the tank, the element 24 extending through an opening in the side of the tank, as shown. Thermostatic switches of the type shown are well known and therefore the details are not disclosed; suffice to say, thermostatic element 24a operates to close switch 24b as the temperature drops to 120° F. and to open the switch as the temperature increases above 122° F., for example. The circuit for the solenoid includes the positive terminal of a battery, not shown, wire 26 to one terminal of switch 24b, wire 27 to one terminal of solenoid 22c, and wire 28 to ground. It will be understood that the battery furnishes proper current to attract the armature of the solenoid which is connected by suitable linkage 22d to valve member 22b to shift the valve member from a horizontal position, which permits flow of gases through the valve body to exhaust, to the position shown in FIG. 1 to divert gases through port 22a. It will be seen that when the temperature of air passing to outlet 10b falls below 120° F., the thermal element 24a closes switch 24b causing solenoid 22c to be energized and the exhaust gases to be directed through heat exchanger 21. When the temperature of the air passing over thermostatic element 24a attains a temperature of 122° F., the thermostatic element operates switch 24b to open the circuit for solenoid 22c, which upon deenergization effects shifting of valve member 22b to its "through" position to discontinue heating of water 11 by the exchanger.

By the arrangement just described it will be seen that the air supply to carburetor C will be maintained at a given temperature, preferably above atmospheric temperature, and the relative humidity thereof will be maintained at 100% irrespective of the temperature and relative humidity prevailing in the atmosphere.

As mentioned heretofore, air is fed to the intake 10a of the processing tank 10 by a blower B which draws air in inlet B1 and exhausts it through outlet B2 connected by tube B3 to inlet 10a. Blower B is driven by a pulley B4 which is rotated by a belt B5 attached to a drive wheel, not shown, driven by the engine so that the speed of the blower is proportional to the speed of the engine and the pressure of the air at the carburetor inlet will be constant although the engine speed may vary.

Figure 5:
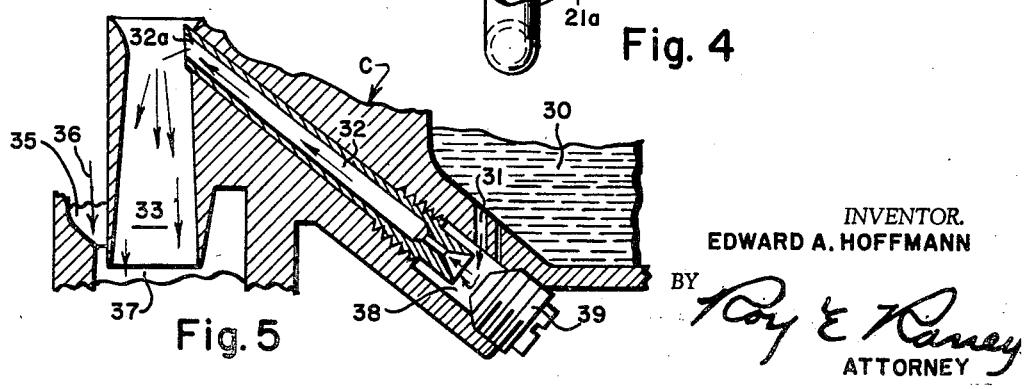
FIG. 5 is a fragmentary sectional view of the carburetor of the engine shown in FIG. 1, but on a larger scale.

Carburetor C may be of any conventional type, and referring to FIG. 5, a portion thereof is shown which includes a fuel reservoir 30 having an opening 31 in the bottom thereof which feeds fuel to a main metering jet 32 which extends through a bore to discharge fuel at 32a into an auxiliary venturi 33 through which air passes to manifold I, as indicated by arrows, the air flow rate being in accordance with the position of the usual throttling valve, not shown, located downstream from the venturi. Air which which passes jet opening 32a entrains and vaporizes the fuel issuing from the opening, and this fuel and air is further mixed with air passing downwardly through primary venturi 35, as indicated by arrows 36. The air and fuel become completely mixed in the passage 37 and downstream therefrom as it is drawn to the cylinders of the engine. As shown jet 32 can be readily replaced through opening 38 closed by plug 39.

By selecting a jet 32 having a proper sized fuel orifice, the resulting mixture of fuel and processed air in the carburetor produces a combination which will burn completely thereby eliminating noxious products of combustion and at the same time delivering maximum power. The proper size jet may be arrived at by testing various sizes to determine which results in maximum fuel efficiency. It has been found that by providing a supply of air to the carburetor under relatively fixed pressures and at constant temperature and humidity, as described, the orifice diameter of jet 32 can be appreciably smaller than in the usual carburetor arrangements so that an appreciable saving in fuel is effected while eliminating noxious fumes and deleterious products of incomplete combustion.

It will be seen that by my invention, irrespective of the changes in atmospheric conditions engine E is supplied with a given combustion supporting atmosphere having a fixed temperature and humidity condition so that the proper fuel supply can be added thereto as in the carburetor to provide a perfect combustible mixture to be fed to the cylinders of the engine which results in perfect combustion, delivering maximum power with practically no noxious or polluting products of combustion.

Although I have described but one form of the invention, it is to be understood that other forms, modifications and adaptations can be made, all falling within the scope of the claims which follow.

I claim:
1. In a fuel burning apparatus, means to mix fuel and air including:
 (a) means having a fixed fuel flow opening,
 (b) means forming a flow path for air past said fuel flow opening,
 (c) means upstream from said fuel flow opening maintaining a body of water,
 (d) means to discharge air in said body of water, and
 (e) means to maintain the temperature of air passing toward said fuel flow opening at a predetermined degree.

2. A fuel burning apparatus defined in claim 1 in which the last mentioned means includes means to control the temperature of said body of water.

3. In a fuel feeding apparatus, means to mix fuel and air including:
 (a) means having a fixed fuel flow opening,
 (b) means forming a flow path for air past said fuel flow opening,
 (c) a water container in said flow path for air upstream from said fuel flow opening for containing a body of water,
 (d) a plurality of tubular members disposed within said container in the lower portion thereof, said tubular member having a multiplicity of relatively small openings in the walls thereof, one end of said tubular members being closed and the opposite end being connected with manifold means open to an air supply, conduit means connecting said container with the first mentioned means, and (e) means to maintain the temperature of air passing toward said fuel flow opening at a predetermined degree.

4. In a fuel burning apparatus, means to mix fuel and air including:
(a) means having a fixed fuel flow opening,
(b) means forming a flow path for air past said fuel flow opening,
(c) means upstream from said fuel flow opening maintaining a body of water,
(d) means to discharge air in said body of water including,
 (i) a blower for directing air to said means maintaining a body of water, and
 (ii) means to drive said blower at a speed proportional to the speed of the engine, and
(e) means to maintain the temperature of air passing toward said fuel flow opening at a predetermined degree.

5. In a fuel burning apparatus as defined in claim 1 in which the last mentioned means includes means to control the flow of a heating medium into heat exchange relation with said body of water in response to the temperature of air passing from said body of water to maintain the temperature of the air passing from said body of water at a predetermined degree.

References Cited in the file of this patent
UNITED STATES PATENTS

| | | |
|---|---|---|
| 1,185,131 | Reimers | May 30, 1916 |
| 1,253,642 | Steere | Jan. 15, 1918 |
| 1,542,353 | Ash | June 16, 1925 |